(12) United States Patent
Maguire et al.

(10) Patent No.: US 12,230,826 B2
(45) Date of Patent: Feb. 18, 2025

(54) METHODS FOR ASSEMBLING TRACTION BATTERY PACKS

(71) Applicant: FORD GLOBAL TECHNOLOGIES, LLC, Dearborn, MI (US)

(72) Inventors: Patrick Daniel Maguire, Ann Arbor, MI (US); Che-Chun Chang, Ann Arbor, MI (US); Marc Dugas, Wixom, MI (US); Mohammadreza Eftekhari, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 224 days.

(21) Appl. No.: 17/946,386

(22) Filed: Sep. 16, 2022

(65) Prior Publication Data

US 2023/0307769 A1    Sep. 28, 2023

Related U.S. Application Data

(60) Provisional application No. 63/322,766, filed on Mar. 23, 2022.

(51) Int. Cl.
| | | |
|---|---|---|
| *H01M 50/264* | (2021.01) | |
| *H01M 50/209* | (2021.01) | |
| *H01M 50/291* | (2021.01) | |
| *B60K 1/04* | (2019.01) | |
| *B60K 6/28* | (2007.10) | |

(52) U.S. Cl.
CPC ....... *H01M 50/264* (2021.01); *H01M 50/209* (2021.01); *H01M 50/291* (2021.01); *B60K 1/04* (2013.01); *B60K 6/28* (2013.01); *H01M 2220/20* (2013.01)

(58) Field of Classification Search
CPC .................................................. H01M 8/248
See application file for complete search history.

(56) References Cited

U.S. PATENT DOCUMENTS

| | | |
|---|---|---|
| 8,089,248 B2 | 1/2012 | Tabatowski-Bush |
| 8,968,912 B2 | 3/2015 | Maguire et al. |
| 9,217,781 B2 | 12/2015 | Tabatowski-Bush et al. |
| 9,425,628 B2 | 8/2016 | Pham et al. |
| 9,446,680 B2 | 9/2016 | Chen et al. |
| 9,515,357 B2 | 12/2016 | Haskins et al. |
| 9,799,932 B2 | 10/2017 | Haskins et al. |
| 10,109,897 B2 | 10/2018 | Haskins et al. |
| 10,566,647 B2 | 2/2020 | Andryukov et al. |
| 10,601,006 B2 | 3/2020 | Maguire et al. |

(Continued)

FOREIGN PATENT DOCUMENTS

| | | |
|---|---|---|
| CN | 101860053 A | 10/2010 |
| CN | 101860053 B | 4/2015 |

(Continued)

*Primary Examiner* — Jeffry H Aftergut
(74) *Attorney, Agent, or Firm* — David B. Kelley; Carlson, Gaskey & Olds, P.C.

(57) ABSTRACT

Manufacturing processes are disclosed for assembling traction battery packs that include battery systems, such as cell-to-pack battery systems. An exemplary assembly method includes inserting one or more cell stacks of the cell-to-pack battery system into a cell-compressing opening of an enclosure tray. The method may involve the use of slider plates that provide sliding surfaces that facilitate the insertion of the cell stacks into the cell compressing opening.

19 Claims, 4 Drawing Sheets

(56) References Cited

U.S. PATENT DOCUMENTS

| | | |
|---|---|---|
| 10,608,222 B2 | 3/2020 | Montgomery et al. |
| 10,759,281 B2 | 9/2020 | Miller et al. |
| 10,784,495 B2 | 9/2020 | Fernandez-Galindo et al. |
| 11,005,131 B2 | 5/2021 | Zhou et al. |
| 11,024,913 B2 | 6/2021 | Subramanian et al. |
| 11,031,647 B2 | 6/2021 | Kang |
| 11,050,125 B1 | 6/2021 | Zhu et al. |
| 11,114,726 B2 | 9/2021 | Gu et al. |
| 11,128,009 B2 | 9/2021 | Chen et al. |
| 11,139,537 B2 | 10/2021 | Wu et al. |
| 11,217,847 B2 | 1/2022 | Eftekhari et al. |
| 11,258,119 B2 | 2/2022 | Wang et al. |
| 11,264,669 B2 | 3/2022 | Jiang |
| 11,283,130 B2 | 3/2022 | Chen et al. |
| 11,289,750 B2 | 3/2022 | Zhou et al. |
| 11,302,972 B2 | 4/2022 | Chu et al. |
| 11,302,973 B2 | 4/2022 | Maguire et al. |
| 11,302,990 B2 | 4/2022 | Huang et al. |
| 11,322,772 B2 | 5/2022 | Melack et al. |
| 11,329,347 B2 | 5/2022 | Huang et al. |
| 11,335,960 B2 | 5/2022 | Wang et al. |
| 11,362,392 B2 | 6/2022 | Wang et al. |
| 11,362,393 B2 | 6/2022 | Wang et al. |
| 11,387,519 B2 | 7/2022 | Huang et al. |
| 11,404,744 B1 | 8/2022 | Yang et al. |
| 11,417,932 B2 | 8/2022 | Tang et al. |
| 11,417,936 B2 | 8/2022 | Wang et al. |
| 2010/0259221 A1 | 10/2010 | Tabatowski-Bush |
| 2013/0164592 A1 | 6/2013 | Maguire et al. |
| 2017/0104251 A1 | 4/2017 | Wang |
| 2018/0083306 A1* | 3/2018 | Melack ............ H01M 10/0481 |
| 2019/0305389 A1 | 10/2019 | Poirier et al. |
| 2020/0091494 A1 | 3/2020 | Fernandez-Galindo et al. |
| 2020/0203684 A1 | 6/2020 | Chen et al. |
| 2020/0203779 A1 | 6/2020 | Wang et al. |
| 2020/0212387 A1 | 7/2020 | Su et al. |
| 2020/0212397 A1 | 7/2020 | Wang et al. |
| 2020/0212418 A1 | 7/2020 | Chen et al. |
| 2020/0303689 A1* | 9/2020 | Kinno ................ H01M 4/5815 |
| 2020/0328386 A1 | 10/2020 | Kellner et al. |
| 2020/0381697 A1 | 12/2020 | Fernandez-Galindo et al. |
| 2021/0066686 A1 | 3/2021 | Siewert et al. |
| 2021/0091348 A1 | 3/2021 | Lateef et al. |
| 2021/0091437 A1 | 3/2021 | Chen et al. |
| 2021/0104798 A1 | 4/2021 | Jiang et al. |
| 2021/0119279 A1 | 4/2021 | Wang et al. |
| 2021/0218117 A1 | 7/2021 | Zhu et al. |
| 2021/0229541 A1 | 7/2021 | Smith et al. |
| 2021/0305641 A1 | 9/2021 | Bai et al. |
| 2021/0305642 A1 | 9/2021 | Bai et al. |
| 2021/0320349 A1 | 10/2021 | Jiang et al. |
| 2021/0320372 A1 | 10/2021 | Jiang et al. |
| 2021/0402863 A1 | 12/2021 | Huang et al. |
| 2021/0408634 A1 | 12/2021 | Yin et al. |
| 2022/0052414 A1 | 2/2022 | Huang et al. |
| 2022/0052415 A1 | 2/2022 | Huang et al. |
| 2022/0059897 A1 | 2/2022 | Huang et al. |
| 2022/0059902 A1 | 2/2022 | Jiang et al. |
| 2022/0077521 A1 | 3/2022 | Jin et al. |
| 2022/0085450 A1 | 3/2022 | Chu et al. |
| 2022/0102800 A1 | 3/2022 | Wang et al. |
| 2022/0109211 A1 | 4/2022 | Wang et al. |
| 2022/0123394 A1 | 4/2022 | Zhang et al. |
| 2022/0123423 A1 | 4/2022 | Wang et al. |
| 2022/0140414 A1 | 5/2022 | Choi et al. |
| 2022/0149458 A1 | 5/2022 | Jiang et al. |
| 2022/0158296 A1 | 5/2022 | Chen et al. |
| 2022/0185088 A1 | 6/2022 | Zhang et al. |
| 2022/0190416 A1 | 6/2022 | Wu |
| 2022/0190423 A1 | 6/2022 | Wu et al. |
| 2022/0216555 A1 | 7/2022 | Huang et al. |
| 2022/0221084 A1 | 7/2022 | Huang et al. |
| 2022/0231370 A1 | 7/2022 | Yang et al. |
| 2022/0231371 A1 | 7/2022 | Jiang et al. |
| 2022/0255172 A1 | 8/2022 | Guo et al. |
| 2023/0134618 A1* | 5/2023 | Kopra ................ H01M 50/291 429/99 |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104229 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 110416448 A | 11/2019 |
| CN | 209592271 U | 11/2019 |
| CN | 209607884 U | 11/2019 |
| CN | 209661720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109074281 B | 5/2021 |
| CN | 111354987 B | 5/2021 |
| CN | 111384337 B | 5/2021 |
| CN | 112331981 B | 9/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |

(56) References Cited

FOREIGN PATENT DOCUMENTS

| | | |
|---|---|---|
| CN | 216750072 U | 6/2022 |
| CN | 216750142 U | 6/2022 |
| CN | 216872085 U | 7/2022 |
| CN | 216903107 U | 7/2022 |
| CN | 216903128 U | 7/2022 |
| CN | 216903497 U | 7/2022 |
| DE | 102016119118 A1 | 4/2017 |
| DE | 102017121796 A1 | 3/2018 |
| DE | 102019108631 A1 | 10/2019 |
| DE | 102019125140 A1 | 3/2020 |
| DE | 102020124986 A1 | 3/2021 |
| DE | 102021101385 A1 | 9/2021 |
| EP | 3671904 A1 | 6/2020 |
| EP | 3671940 A1 | 6/2020 |
| EP | 3672377 A1 | 6/2020 |
| EP | 3675204 A1 | 7/2020 |
| EP | 3675207 A1 | 7/2020 |
| EP | 3675216 B1 | 7/2020 |
| EP | 3675217 A1 | 7/2020 |
| EP | 3675220 A1 | 7/2020 |
| EP | 3675221 A1 | 7/2020 |
| EP | 3675236 A1 | 7/2020 |
| EP | 3675271 A1 | 7/2020 |
| EP | 3798491 A1 | 3/2021 |
| EP | 3799150 A1 | 3/2021 |
| EP | 3799151 A1 | 3/2021 |
| EP | 3905366 A1 | 3/2021 |
| EP | 3806231 A1 | 4/2021 |
| EP | 3852187 A1 | 7/2021 |
| EP | 3920255 A1 | 8/2021 |
| EP | 3883005 A1 | 9/2021 |
| EP | 3883006 A1 | 9/2021 |
| EP | 3883042 A1 | 9/2021 |
| EP | 3886198 A1 | 9/2021 |
| EP | 3886200 A1 | 9/2021 |
| EP | 3886201 A1 | 9/2021 |
| EP | 3671893 B1 | 11/2021 |
| EP | 3699979 B1 | 11/2021 |
| EP | 3920315 A1 | 12/2021 |
| EP | 3930027 A1 | 12/2021 |
| EP | 3944397 A1 | 1/2022 |
| EP | 3944398 A1 | 1/2022 |
| EP | 3955333 A1 | 2/2022 |
| EP | 3799194 B1 | 3/2022 |
| EP | 3985787 A1 | 4/2022 |
| EP | 3799153 B1 | 6/2022 |
| JP | 2010246372 A | 10/2010 |
| KR | 1020100112530 A | 10/2010 |
| KR | 101695641 B1 | 1/2017 |

\* cited by examiner

METHODS FOR ASSEMBLING TRACTION BATTERY PACKS

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs, and more particularly to methods that involve the use of sliding surfaces for assembling traction battery packs that include battery systems, such as cell-to-pack battery systems.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack can power the electric machines and other electrical loads of the vehicle.

Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A method for assembling a traction battery pack according to an exemplary according to an exemplary aspect of the present disclosure includes, among other things, arranging a group of battery cells in a compression fixture, compressing the group of battery cells between a first slider plate and a second slider plate within the compression fixture to provide a first cell stack, positioning the first cell stack relative to an enclosure tray of the traction battery pack, and inserting the first cell stack into a cell-compressing opening of the enclosure tray.

In a further non-limiting embodiment of the foregoing method, the cell stack is part of a cell-to-pack battery system of the traction battery pack.

In a further non-limiting embodiment of either of the foregoing methods, the method includes, after the inserting, applying a compressive force to the cell stack via the cell-compressing opening.

In a further non-limiting embodiment of any of the foregoing methods, arranging the group of battery cells includes stacking the group of battery cells between the first slider plate and the second slider plate along a cell stack axis.

In a further non-limiting embodiment of any of the foregoing methods, a separator plate is disposed between each adjacent pair of battery cells of the group of battery cells.

In a further non-limiting embodiment of any of the foregoing methods, inserting the cell stack into the cell-compressing opening includes applying a downward force to the first cell stack to move the first cell stack into the enclosure tray.

In a further non-limiting embodiment of any of the foregoing methods, compressing the group of battery cells includes applying a compression force via the compression fixture along a cell stack axis to compress the group of battery cells between the first slider plate and the second slider plate.

In a further non-limiting embodiment of any of the foregoing methods, positioning the first cell stack includes positioning the first cell stack above the enclosure tray.

In a further non-limiting embodiment of any of the foregoing methods, inserting the first cell stack includes inserting the first cell stack into the enclosure tray using a top-down approach.

In a further non-limiting embodiment of any of the foregoing methods, the first slider plate and the second slider plate each include a chamfered leading edge for facilitating the inserting.

In a further non-limiting embodiment of any of the foregoing methods, the first slider plate and the second slider plate each include a sliding surface for facilitating the inserting.

In a further non-limiting embodiment of any of the foregoing methods, the first slider plate and the second slider plate each include a frame and a compressible material. The compressible material is configured to permit expansion of the group of battery cells within the first cell stack after the inserting.

In a further non-limiting embodiment of any of the foregoing methods, the method includes, prior to the compressing, attaching the first slider plate to a first battery cell of the group of battery cells with a first adhesive, and attaching the second slider plate to a second battery cell of the group of battery cells with a second adhesive.

In a further non-limiting embodiment of any of the foregoing methods, the method includes arranging a second group of battery cells in a second compression fixture, compressing the second group of battery cells between a third slider plate and a fourth slider plate within the second compression fixture to provide a second cell stack, positioning the second cell stack relative to the enclosure tray, and inserting the second cell stack into the cell-compressing opening of the enclosure tray at a location adjacent to the first cell stack.

In a further non-limiting embodiment of any of the foregoing methods, the method includes inserting a cell stack of a cell-to-pack battery system into a cell-compressing opening of an enclosure tray of the traction battery pack. During the inserting, a slider plate of the cell stack provides a sliding surface for facilitating insertion of the cell stack.

In a further non-limiting embodiment of any of the foregoing methods, the method includes, prior to the inserting, applying a compressive force to compress the cell stack to a desired length.

In a further non-limiting embodiment of any of the foregoing methods, the compressive force is applied along a cell stack axis by a compression fixture.

In a further non-limiting embodiment of any of the foregoing methods, the slider plate provides a chamfered leading edge for facilitating the inserting.

In a further non-limiting embodiment of any of the foregoing methods, the inserting includes applying a downward force to move the cell stack into the enclosure tray.

In a further non-limiting embodiment of any of the foregoing methods, the downward force is applied transversely to a compressive force applied to the cell stack during the inserting.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details manufacturing processes for assembling traction battery packs that include battery systems, such as cell-to-pack battery systems. An exemplary assembly method includes inserting one or more cell stacks of the cell-to-pack battery system into a cell-compressing opening of an enclosure tray. The method may involve the use of slider plates that provide sliding surfaces that facilitate the insertion of the cell stacks into the cell compressing opening. These and other features are discussed in greater detail in the following paragraphs of this detailed description.

Figure 1:
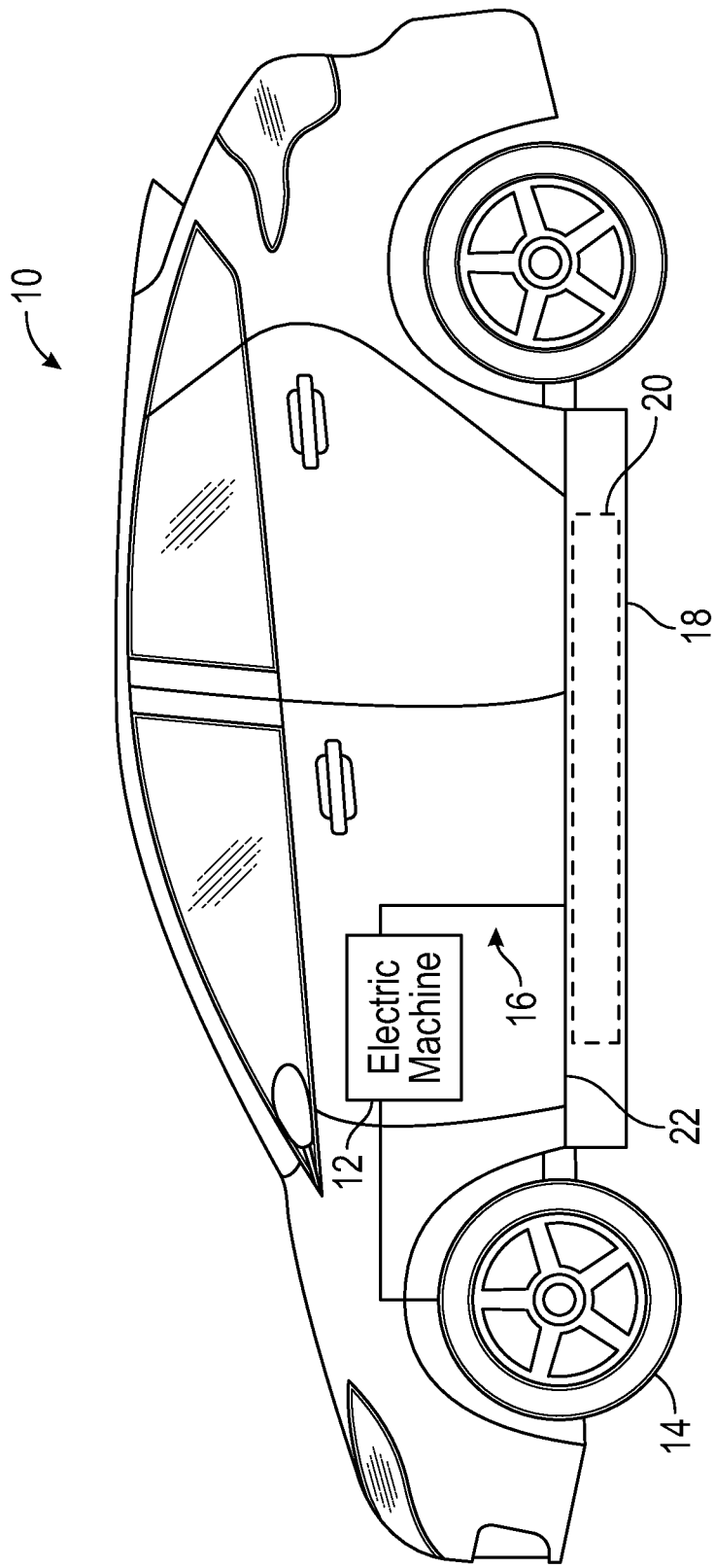
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power to power the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules inside the batter enclosure. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
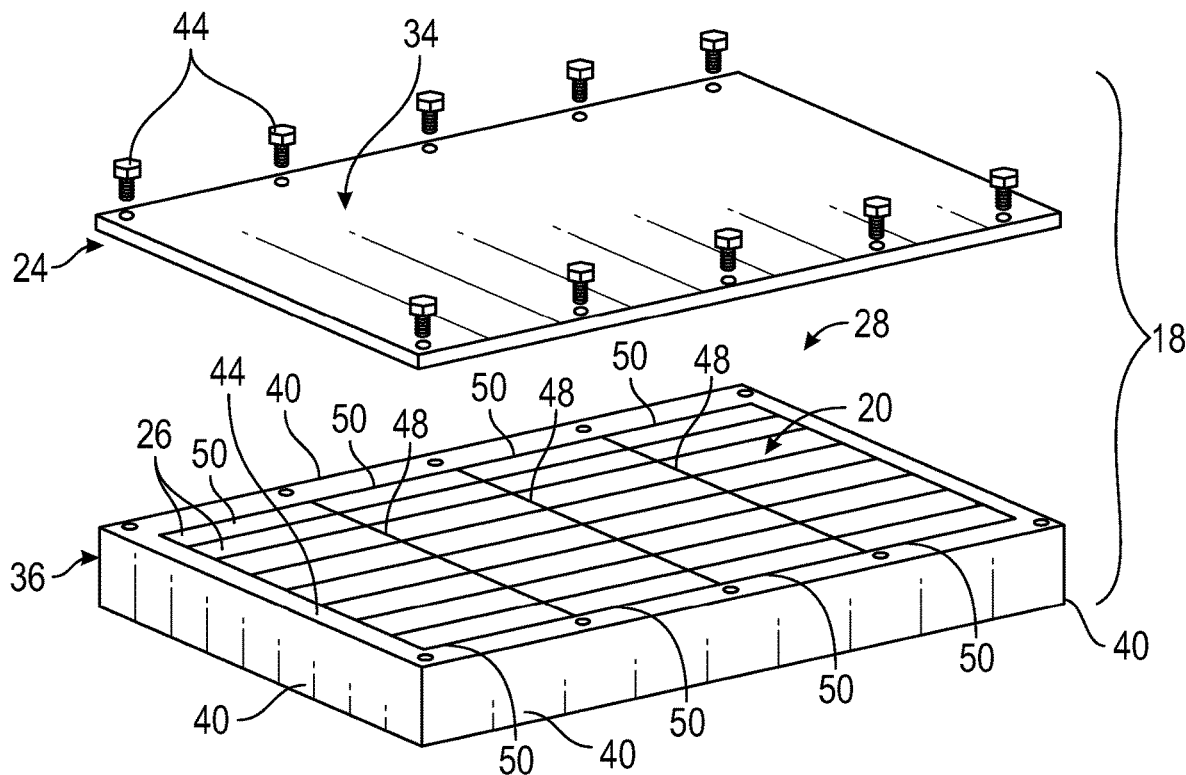
FIG. 2 illustrates a traction battery pack of the electrified vehicle of FIG. 1.
Figure 3:
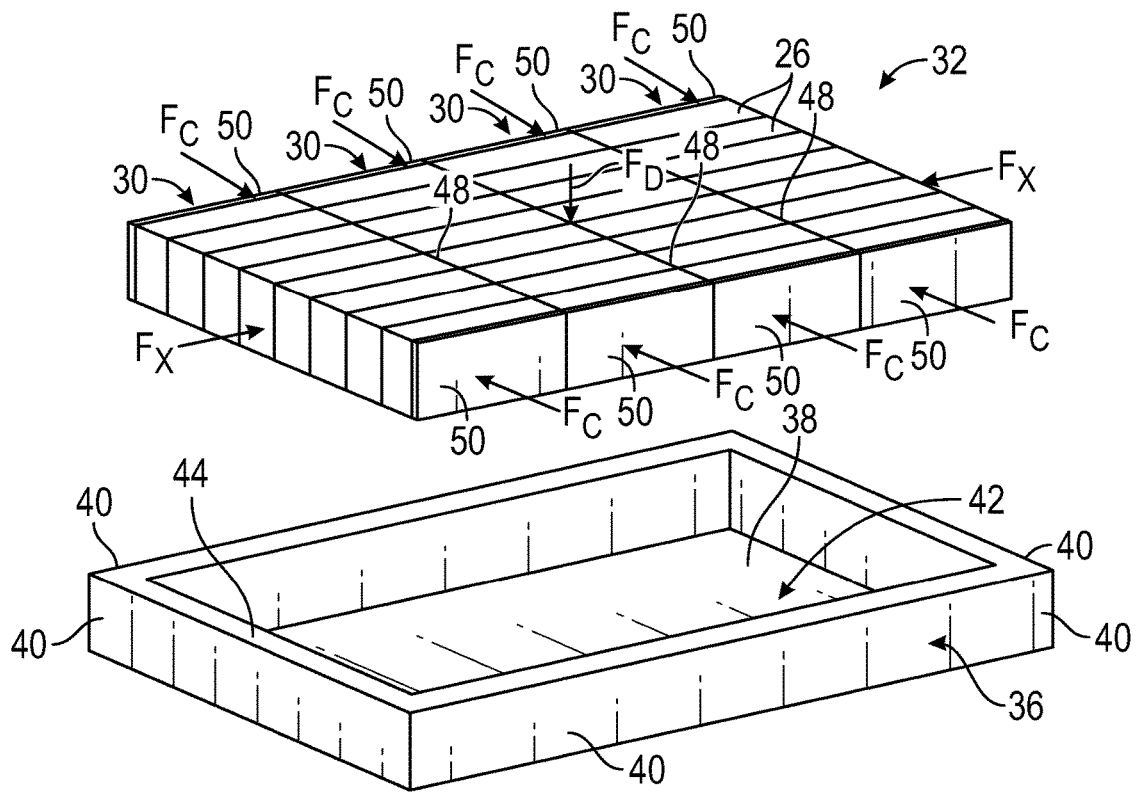
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. In another embodiment, each cell stack 30 includes ten individual battery cells 26, and the cell matrix 32 includes five cell stacks 30 for a total of fifty battery cells 26 (see FIG. 4). Providing an even quantity of battery cells 26 and an even quantity of cell stacks 30 can help to support an efficient electrical bussing arrangement. Although a specific number of battery cells 26 and cells stacks 30 are illustrated in various figures of this disclosure, the cell-to-pack battery system 20 of the traction battery pack 18 could include any number of battery cells 26 and any number of cell stacks 30. In other words, this disclosure is not limited to the exemplary configurations shown in FIGS. 2, 3, and 4.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36.

The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply compressive forces to the cell matrix 32 when the cell matrix 32 is positioned within the cell-compressing opening 42. An entire perimeter of the cell-compressing opening 42 may be established by the side walls 40 of the enclosure tray 36. The side walls 40 can apply the compressive forces to the battery cells 26 about the entire perimeter of the cell matrix 32. The side walls 40 may therefore function as a rigid halo-type structure that compresses and tightly holds the cell matrix 32.

The configuration described above may be considered to be a cell-to-pack type battery pack, which differs from conventional battery pack types that include outer enclosures holding arrays of battery cells enclosed by array support structures that are spaced apart from walls of the battery enclosure, and where the outer enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover and structural stiffness.

The cell-to-pack battery system 20 may include one or more cell row separators 48. In an embodiment, one cell row separator 48 is positioned between each adjacent pair of cell stacks 30 of the cell matrix 32. In other embodiments, two cell row separators 48 are provided with each cell stack 30. However, the total number of cell row separators 48 provided within the cell-to-pack battery system 20 is not intended to limit this disclosure.

The cell-to-pack battery system 20 may further include one or more slider plates 50. The slider plates 50 may be positioned between each cell stack 30 and the enclosure tray 36, with one slider plate 50 being located at each longitudinal extent each the cell stack 30. As further discussed below, the slider plates 50 may facilitate the insertion of each cell stack 30 into the cell-compressing opening 42 of the enclosure tray 36.

Figure 4:
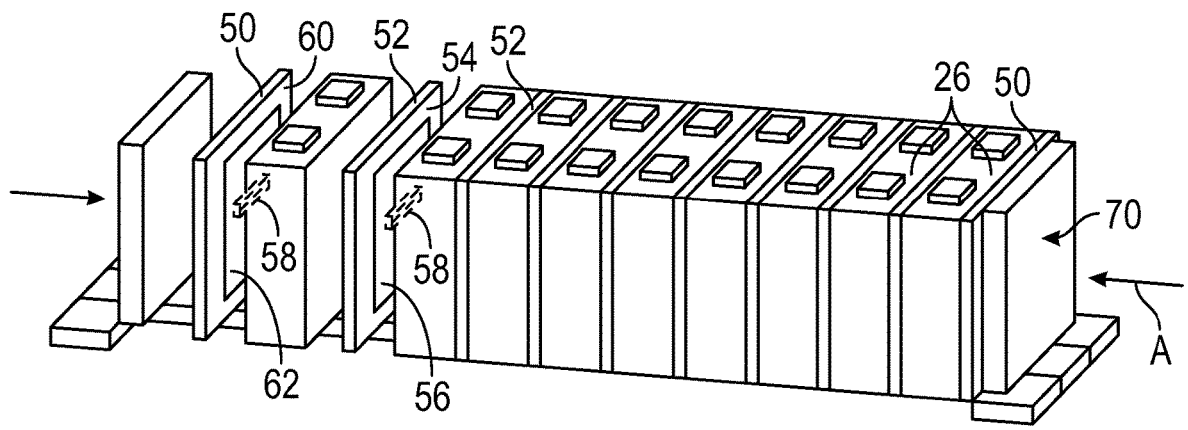
FIGS. 4, 5, and 6 schematically illustrate a method of assembling a traction battery pack that includes a cell-to-pack battery system.
Figure 5:
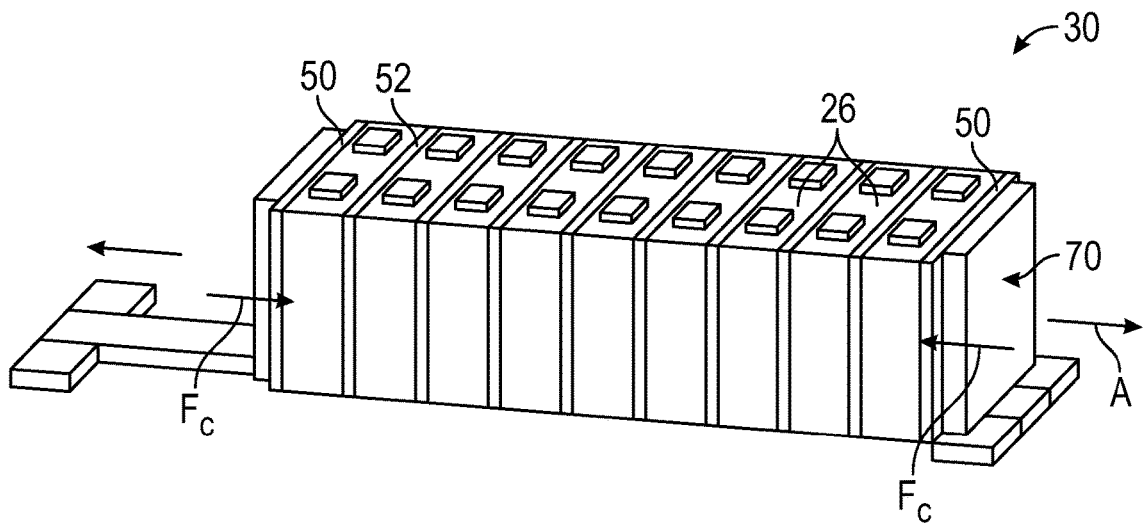
Figure 6:
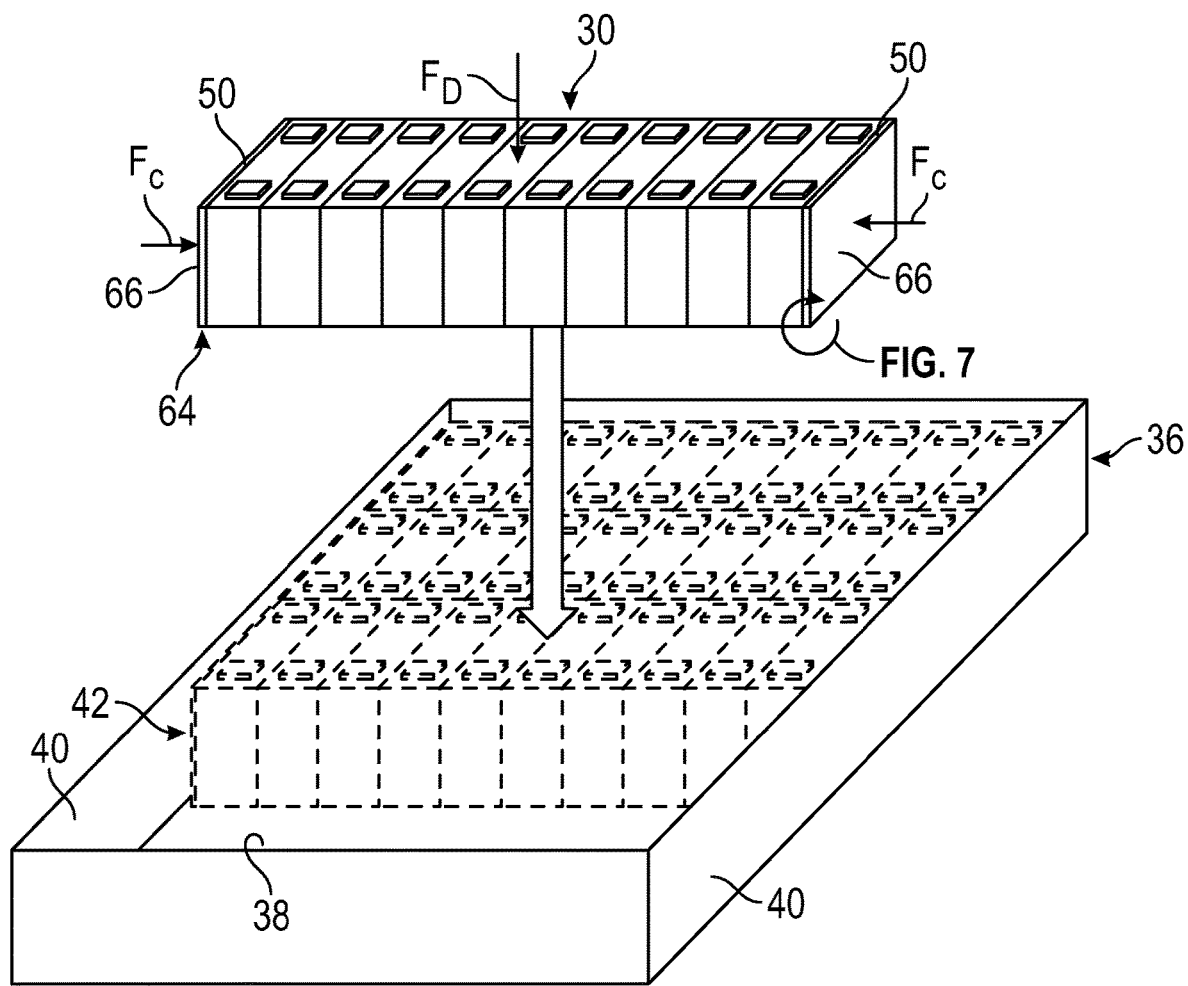

FIGS. 4, 5, and 6, with continued reference to FIGS. 1-3, schematically illustrate a method for assembling portions of the traction battery pack 18. The method may include a greater or fewer number of steps than recited below, and the exact order of the steps is not intended to limit this disclosure.

Referring first to FIG. 4, each cell stack 30 of the cell-to-pack battery system 20 may first be staged by positioning a group of battery cells 26 within a compression fixture 70. The battery cells 26 may be arranged relative to one another along a cell stack axis A. The compression fixture 70 may provide a reference point relative to at least two adjacent sides of the group of batter cells 26 (e.g., bottom and end) for arranging the battery cells 26 along the cell stack axis A.

In this embodiment, within the cell stack 30, separator plates 52 are disposed along the cell stack axis A between each of adjacent pair of battery cells 26. The separator plates 52 may include a frame portion 54 that holds a compressible material 56. The compressible material 56 can compress to permit some expansion of the battery cells 26. In an embodiment, the compressible material 56 is foam. However, other compressible materials could alternatively be utilized.

Each separator plate 52 may be secured to two surrounding battery cells 26 by an adhesive 58. In an embodiment, the adhesive 58 is a two-sided adhesive tape.

Further, a slider plate 50 may be disposed at each opposing axial end of the group of battery cells 26. The slider plates 50 may each include a frame portion 60 that holds a compressible material 62. The frame portion 60 may be made of a relatively dense material (e.g., a rigid thermoplastic or thermoset polymer such as PA6, PA66, PP, PBT, UP, or any other similar polymer).

The compressible material 62 can compress to permit some expansion of the battery cells 26. In an embodiment, the compressible material 62 is foam. However, other compressive materials could alternatively be utilized.

One slider plate 50 may be secured to the battery cell 26 located at each opposing axial end of the grouping of battery cells 26 by an adhesive 58. In an embodiment, the adhesive 58 is a two-sided adhesive tape.

Referring to FIG. 5, the slider plates 50, the battery cells 26, and the separator plates 52 may next be compressed along the cell stack axis A to provide one of the cell stacks 30. The compression fixture 70 may exert a compressive force Fc along the cell stack axis A to opposed ends of the cell stack 30. The compressive force Fc essentially squeezes the battery cells 26 between the slider plates 50, thereby compressing the cell stack 30 and the individual battery cells 26 to a desired cell stack length.

In an embodiment, the compressive force Fc exerted on the battery cells 26 by the compression fixture 70 is about 3 kilonewtons. However, the actual compression force applied can vary depending on the battery cell type, among other factors. In this disclosure, the term "about" means that the expressed quantities or ranges need not be exact but may be approximated and/or larger or smaller, reflecting acceptable tolerances, conversion factors, measurement error, etc.

The compression fixture 70 could be driven by a pneumatic actuator to compress the battery cells 26 along the cell stack axis A. However, other types of actuators, such as a DC electrical or a mechanical screw actuator, could alternatively be employed for achieving the compression.

Next, as shown in FIG. 6, the cell stack 30 that was previously arranged and compressed in the manner shown in FIGS. 4 and 5 may be positioned relative to the enclosure tray 36. In an embodiment, the cell stack 30 may be positioned vertically above the enclosure tray 36 with the floor 38 facing upwardly toward the cell stack. As schematically illustrated, the compressive forces Fc may be maintained during the positioning of the cell stack 30.

Using a top-down approach, the cell stack 30 may then be inserted into the cell-compressing opening 42 of the enclosure tray 36 by exerting a downward force FD. The cell stack 30 may therefore be inserted into the enclosure tray 36 individually. The downward force FD may be applied directly to one or more battery cells 26 of the cell stack 30. The downward force FD is applied in a direction that is generally perpendicular to the compressive forces Fc. The downward force FD may be provided by yet another actuator.

Figure 7:
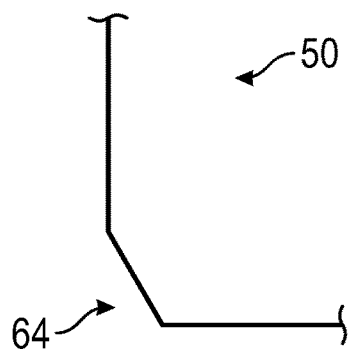
FIG. 7 is a blown-up view of select portions of FIG. 6.

While the term "downward" is used herein to describe the downward force FD, it should be understood that the term "downward" is used herein to refer to forces tending to press a cell stack 30 into the cell-compressing opening 42. In particular, the term "downward" refers to all forces substantially perpendicular to the compressive force Fc, whether or not the force is truly in a "downward" direction. For example, this disclosure extends to cell stacks that are compressed and inserted into a cell-compressing opening in a sideways direction To facilitate the inserting, the slider plates 50 associated with the cell stack 30 may include a leading edge 64 that is chamfered or curved (see FIG. 7). Chamfers on the leading edges 64 can help to guide the cell stack 30 into the cell-compressing opening 42 during the inserting. Moreover, a sliding surface 66 (e.g., the surface that faces in a direction away from the battery cells 26) of each slider plate 50 may interface directly with one of the side walls 40 of the enclosure tray 36 during the inserting.

After the inserting, the cell-compressing opening 42 of the enclosure tray 36 may circumferentially surround the cell stack 30. The cell-compressing opening 42 may thus exert a compressive force on the cell stack 30. The cell-compressing opening 42 may permit some expansion of the battery cells 26 after they are removed from the compression fixture 70. The compressive forces exerted on the cell stack 30 by the enclosure tray 36 after the inserting may be less than the compressive forces Fe exerted on the cell stacks 30 by the compression fixture 70.

In an exemplary method, the method steps schematically illustrated in FIGS. 4-6 can be performed four times to provide and insert the four cell stacks 30 of the cell-to-pack battery system 20. Each of the cell stacks 30 is compressed and held by a different compression fixture that mimics the compression fixture 70. Thus, in this exemplary embodiment, four compression fixtures 70 would be used to provide the four cell stacks 30 of the exemplary cell-to-pack battery system 20.

A top-down approach is utilized to insert each cell stack 30 into the enclosure tray 36 in the exemplary method described above. However, the cell stacks 30 could alternatively be inserted into a halo-like structure using a bottom-up approach. Moreover, although the cell stacks 30 are schematically illustrated as being inserted individually, the cell stacks 30 could be inserted together as a unit of two or more cell stacks (e.g., the cell matrix 32) into the cell-compressing opening 42 of the enclosure tray 36.

The exemplary manufacturing processes described herein provide a methodology for assembling traction battery packs that include cell-to-pack battery systems. The battery cells of the cell-to-pack battery system may advantageously be compressed together between slider plates as part of the proposed methodology, thereby providing solutions to various assembly complexities that can arise as a result of eliminating much of the array support structures associated with conventional traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for assembling a traction battery pack, comprising:
arranging a group of battery cells in a compression fixture;
compressing the group of battery cells between a first slider plate and a second slider plate within the compression fixture to provide a first cell stack, wherein the first slider plate and the second slider plate each include a frame and a compressible material held within the frame;
positioning the first cell stack relative to an enclosure tray of the traction battery pack; and
inserting the first cell stack into a cell-compressing opening of the enclosure tray.

2. The method as recited in claim 1, wherein the first cell stack is part of a cell-to-pack battery system of the traction battery pack.

3. The method as recited in claim 1, comprising, after the inserting, applying a compressive force to the first cell stack via the cell-compressing opening.

4. The method as recited in claim 1, wherein arranging the group of battery cells includes:
stacking the group of battery cells between the first slider plate and the second slider plate along a cell stack axis.

5. The method as recited in claim 4, wherein a separator plate is disposed between each adjacent pair of battery cells of the group of battery cells.

6. The method as recited in claim 1, wherein inserting the first cell stack into the cell-compressing opening includes:
applying a downward force to the first cell stack to move the first cell stack into the enclosure tray.

7. The method as recited in claim 1, wherein compressing the group of battery cells includes:
applying a compression force via the compression fixture along a cell stack axis to compress the group of battery cells between the first slider plate and the second slider plate.

8. The method as recited in claim 1, wherein positioning the first cell stack includes:
positioning the first cell stack above the enclosure tray.

9. The method as recited in claim 8, wherein inserting the first cell stack includes:
inserting the first cell stack into the enclosure tray using a top-down approach.

10. The method as recited in claim 1, wherein the first slider plate and the second slider plate each include a chamfered leading edge for facilitating the inserting.

11. The method as recited in claim 1, wherein the first slider plate and the second slider plate each include a sliding surface for facilitating the inserting.

12. The method as recited in claim 1, wherein the compressible material is configured to permit expansion of the group of battery cells within the first cell stack after the inserting.

13. The method as recited in claim 1, comprising, prior to the compressing, attaching the first slider plate to a first battery cell of the group of battery cells with a first adhesive, and attaching the second slider plate to a second battery cell of the group of battery cells with a second adhesive.

14. The method as recited in claim 1, comprising:
arranging a second group of battery cells in a second compression fixture;
compressing the second group of battery cells between a third slider plate and a fourth slider plate within the second compression fixture to provide a second cell stack;
positioning the second cell stack relative to the enclosure tray; and
inserting the second cell stack into the cell-compressing opening of the enclosure tray at a location adjacent to the first cell stack.

15. The method as recited in claim 1, wherein the frame is comprised of a rigid thermoplastic or a thermoset polymer, and the compressible material is comprised of a foam.

16. The method as recited in claim 1, comprising a first two-sided adhesive tape applied between the first slider plate and a first battery cell of the group of battery cells, and a second two-sided adhesive tape applied between the second slider plate and a second battery cell of the group of battery cells.

17. The method as recited in claim 10, wherein the chamfered leading edge is provided by a clipped corner of the first slider plate or the second slider plate.

18. The method as recited in claim 1, comprising a separator plate disposed between each adjacent pair of battery cells of the group of battery cells, wherein the separator plate includes a second frame and a second compressible material held within the frame.

19. The method as recited in claim 18, wherein an entirety of the frame is separated from the second frame by a first battery cell of the group of battery cells.

* * * * *